United States Patent [19]

Bartholomew

[11] 4,006,922
[45] Feb. 8, 1977

[54] NON-THREADED TUBING CONNECTOR

[75] Inventor: Donald D. Bartholomew, Utica, Mich.

[73] Assignee: Merit Plastics, Inc., East Canton, Ohio

[22] Filed: Feb. 20, 1975

[21] Appl. No.: 551,092

Related U.S. Application Data

[62] Division of Ser. No. 358,916, May 10, 1973, abandoned.

[52] U.S. Cl. .................................. 285/39; 285/81; 285/114; 285/330; 285/315; 285/349; 285/424; 285/DIG. 4

[51] Int. Cl.² ........................................ F16L 35/00

[58] Field of Search ............ 285/255, 114, 315, 81, 285/342, 382, 349, 330, 322, 323, 423, 424, DIG. 4, DIG. 22, 39

[56] References Cited

UNITED STATES PATENTS

| 3,079,182 | 2/1963 | Appleton | 285/382 |
| 3,222,091 | 12/1965 | Marshall | 285/255 |
| 3,326,006 | 6/1967 | Mount | 285/382 |
| 3,796,447 | 3/1974 | Putter | 285/DIG. 4 |

FOREIGN PATENTS OR APPLICATIONS

| 883,687 | 7/1953 | Germany | |
| 2,100,952 | 7/1972 | Germany | 285/DIG. 4 |
| 663,237 | 4/1964 | Italy | 285/233 |

Primary Examiner—Dave W. Arola
Attorney, Agent, or Firm—Harness, Dickey & Pierce

[57] ABSTRACT

A thin plastic tube has at the end a continuous or interrupted inclined plane means which collapses the plastic tube end section over a nipple or another tube end. The plastic tube end section is inserted over the nipple or other tube end to be sealed thereby with a locking ring drawn over the inclined plane means. The locking ring is drawn over the inclined plane surfaces to uniformly collapse the tube end section into engagement with the nipple or other tube end with a sealing force and with the locking sleeve in frictional locked engagement therewith.

3 Claims, 5 Drawing Figures

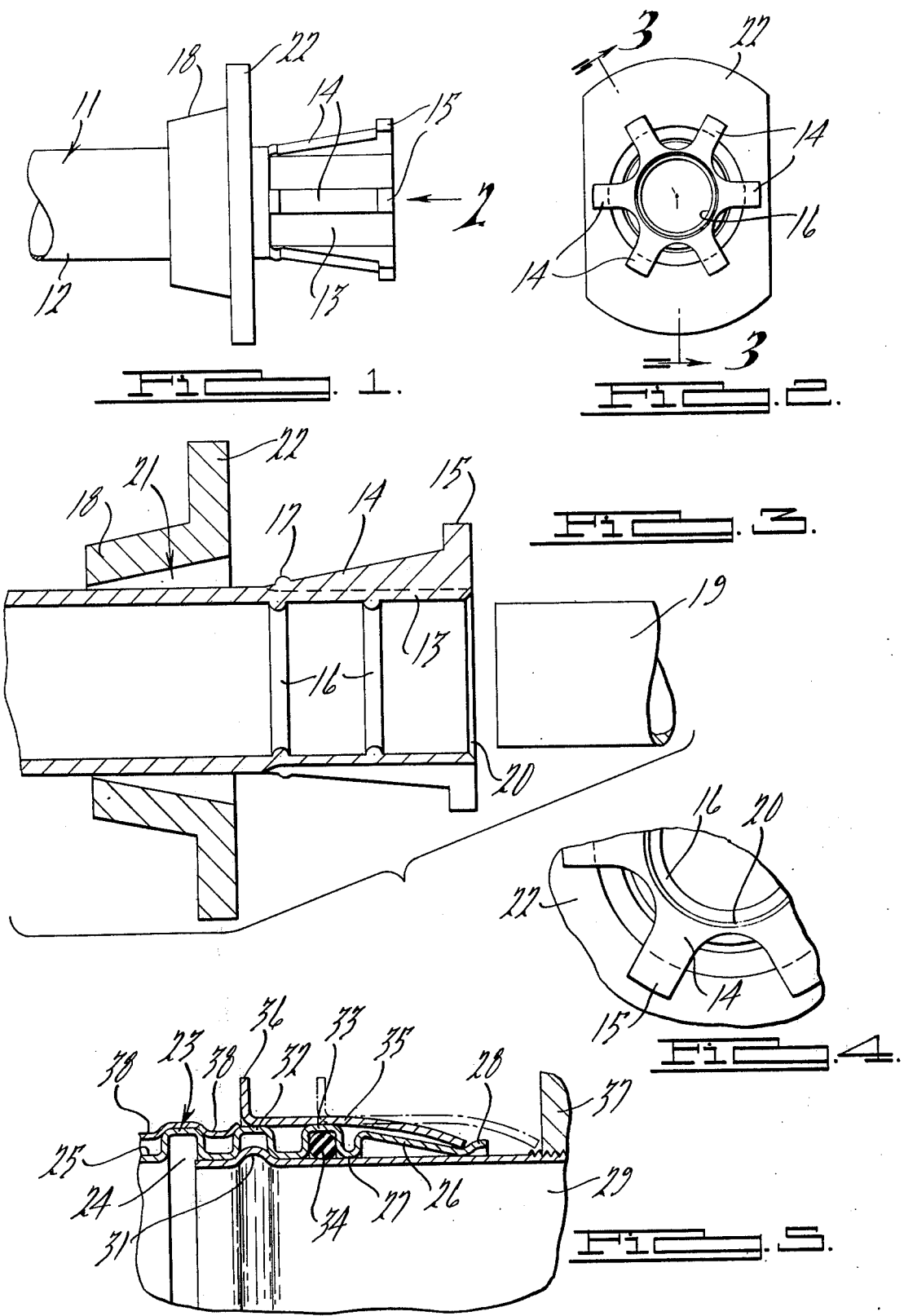

NON-THREADED TUBING CONNECTOR

This is a division of application Ser. No. 358,916, filed May 10, 1973, abandoned.

BACKGROUND OF THE INVENTION

Reference may be had to the patent to W. R. Rinker, No. 3,348,863 to show the securing of a coupling to the end of a hose by wedge elements and elastic seals.

SUMMARY OF THE INVENTION

The invention pertains to a thin plastic tube to be employed as a cooling tubing for engines and the like which is made from a durable plastic material such as nylon or other high temperature resistant plastics. Zytel 91 is a nylon made by DuPont which can be satisfactorily employed as well as one made by Foster Grant No. 1147. An elastomer by DuPont known as Hytrel 6355 or a polyvinylchloride could also be employed for the coolant tube. The tube may have a continuous uniform wall thickness or may be corrugated to permit a greater degree of flexibility thereto. The tube having the continuous wall has the end wall section reduced in thickness and provided with spaced inclined plane sections on the outside thereof. One or more annual beads may be provided on the inner surface of the end wall section and a stop bead may be provided on each of the inclined plane elements for preventing the reverse movement of the clamping sleeve which has an internal truncated conical surface which mates with the inclined plane sections when drawn thereover. When the end section is advanced over a nipple or other tube end which may be made of metal, plastic or the like, the movement of the locking sleeve over the inclined plane sections uniformly collapses the tube over the nipple or tube end and thereby forms a seal therewith. When the internal annular beads are employed on the thin wall end section, the section can expand to permit the insertion of the end section over the nipple or other tube end. The inclination of the plane is small and develops very little force for reversely moving the sleeve therefrom. The stop beads when employed on the spaced inclined plane sections prevents the retractive movement of the locking sleeve on the inclined plane elements.

In another form, the coolant tube is of the corrugated type having an inclined plane for the end section containing a locking lip over which the end of a clamping sleeve is drawn for locking a corrugation over an annular bead on a nipple or tube end which is compressed by the sleeve when moved to locked position over the lip end. A seal such as an O-ring in a corrugation adjacent to the end engages the outer wall of the nipple or the tube end and forms a positive seal therewith.

BRIEF DESCRIPTION OF THE DRAWING

FIG. 1 is a view in elevation of a plastic tube and clamping sleeve in unlocked relation embodying features of the present invention;

FIG. 2 is an end view of the structure illustrated in FIG. 1, as viewed from the end 2 thereof;

FIG. 3 is an enlarged sectional view of the structure illustrated in FIG. 2, taken on the line 3—3 thereof;

FIG. 4 is an enlarged broken view of the structure illustrated in FIG. 2, and

FIG. 5 is a view of structure, similar to that illustrated in FIG. 3, showing another form of the invention.

DESCRIPTION OF THE PREFERRED EMBODIMENTS

Referring to FIGS. 1 to 4 wherein a coolant tube 11 is of uniform cross section having a thin wall 12 made of a plastic material such as one of those above mentioned. The end wall section 13 is reduced in thickness and provided with a plurality of spaced outwardly extending inclined plane sections 14 having a stop projection 15 on the outer end. One or more annular beads 16 are provided on the inside of the thin end wall section 13. The inner ends of the inclined plane sections 14 may have a locking bead or protrusion 17 provided thereon for securing a clamping sleeve 18 on the sections 14. A tube or nipple 19 which is made of metal, plastic or the like has the thin end wall section 13 of the tube 11 inserted thereover, the wall section having a chamfer 20 on the end. If the annular beads 16 are present, the thin tube section 13 can expand to permit the beads to pass over the tube or nipple 19. When the tube section 13 and nipple 19 are in telescoped relation, the locking sleeve 18 is advanced over the inclined plane sections 14 which progressively collapses the end tube section 13 substantially uniformly over the tube or nipple 19. The slope of the inclined plane sections 14 and that of the internal truncated conical surface 21 of the locking sleeve 18 are of such low degree that the clamping sleeve will remain fixed on the surface of the elements 14 and develop insufficient force to overcome the frictional forces between the elements when forceably engaged in the locked position. The ring is normally constructed so as to be more rigid than the material or construction of the collapsing section. This results in a small amount of deformation of the inclined plane sections, which also serves to lock the sleeve in place. To assure the retention of the clamping sleeve 18 in locked position, or prevent travel of the sleeve past the end of the inclined plane one or more beads or protrusions 17 are provided at the lower or upper ends of the inclined plane sections 14 to lock the sleeve 18 thereon when the end passes thereover. A tool may be employed to engage a flange section 22 on the sleeve 18 and the stop sections 15 on the sections 14 for drawing the sleeve thereover. Various plastics, as pointed out hereinabove, may be employed for the tube 11 and clamping sleeve 18 to produce the coolant tube which is durable, which withstands high temperature and which is low in cost.

Another form of coolant tube as illustrated in FIG. 5 has a body 23 of corrugated form providing inwardly presenting annular channel sections 24 between outwardly presenting channel sections 25. A converging truncated conical end section 26 is joined to an outwardly presenting U-shaped section 27, the section 26 having an enlarged locking lip 28 on its end. The tube or nipple 29 has an annular bead 31 near its outer end which is engaged within an inwardly presenting corrugation 32 spaced from the end section 26. The corrugations and locking lip 32 expand when the end of the tube body 23 is inserted over the tube or nipple 29. A corrugation 33 may have a seal, such as an O-ring 34, retained within the inwardly presenting area thereof in position to engage the wall of the tube or nipple 29. A locking sleeve 35 of metal, plastic or the like is placed over the end section 26 of the tube body 23 before it is inserted over the tube or nipple 29. A flange 36 at the end of the sleeve 35 is pulled to draw the end of the sleeve over the locking lip 28 while engaging the outer surface of the corrugations 32 and 33 of the tube body. This urges the O-ring 34 against the wall of the tube or nipple 29 and retains the corrugation 32 in position to lock the outwardly extending annular bead 31 within the inwardly presenting area 24 thereof. In the arrangement illustrated in FIG. 5, the element 29 is a nipple having an end screwed into a threaded opening in an engine block 37. The tube body 23 is flexible and can assume paths of different shape and will expand when pressure builds up therewithin. This expansion can be avoided by applying one or more strips 38 of plastic material over the corrugations which, while substantially reducing the expansion maintains a desired degree of flexibility to the tube body. In either embodiment, the end section of the coolant tube has a wedge relation with a locking sleeve when drawn thereover to produce a pressure on the tube or nipple 29 for retaining it in sealed relation therewith.

I claim:

1. In a tube for a fluid, a tube body having an end section insertable over a tubular element which extends therewithin, the wall of said tube body is corrugated having alternate inwardly and outwardly presenting continuous annular sections, an inwardly presenting continuous annular bead near the end of the tubular element received by an inwardly presenting corrugation into which the bead extends, and means comprising a locking sleeve for securing the inwardly presenting corrugation over said bead, and a sealing element provided in a second inwardly presenting continuous corrugation which is maintained in engagement with said tubular element by said locking sleeve, said tube body having an inclined plane means converging toward the end and having thereat means comprising a locking lip for securing the end of the locking sleeve when passed thereover and moved to locking position.

2. In a tube for a fluid as recited in claim 1, wherein tubular outwardly corrugated means is provided across said outwardly presenting annular sections of said tube body to resist the expansion thereof when pressurized therewithin while retaining a desired degree of flexibility.

3. In a tube for a fluid as recited in claim 1, wherein a radially extending flange is provided on the inner end of the locking sleeve by which its outer end is moved axially over said locking lip.

* * * * *